United States Patent
Danner et al.

(10) Patent No.: US 8,150,583 B2
(45) Date of Patent: Apr. 3, 2012

(54) METHOD AND APPARATUS FOR AVOIDING OR MITIGATING VEHICLE COLLISIONS

(75) Inventors: Bernd Danner, Aichtal (DE); Thomas Dohmke, Waldenbuch (DE); Joerg Hillenbrand, Ettlingen (DE); Volker Schmid, Stuttgart (DE); Andreas Spieker, Stuttgart (DE)

(73) Assignee: Daimler AG, Stuttgart (DE)

( * ) Notice: Subject to any disclaimer, the term of this patent is extended or adjusted under 35 U.S.C. 154(b) by 866 days.

(21) Appl. No.: 11/793,532

(22) PCT Filed: Dec. 9, 2005

(86) PCT No.: PCT/EP2005/013207
§ 371 (c)(1),
(2), (4) Date: Jul. 2, 2008

(87) PCT Pub. No.: WO2006/072342
PCT Pub. Date: Jul. 13, 2006

(65) Prior Publication Data
US 2009/0037055 A1    Feb. 5, 2009

(30) Foreign Application Priority Data
Dec. 24, 2004  (DE) .......................... 10 2004 062 496

(51) Int. Cl.
*B60R 21/01*  (2006.01)
*B60T 7/12*  (2006.01)

(52) U.S. Cl. .......... 701/45; 180/167; 180/268; 180/275; 280/735; 340/435; 340/436; 701/301

(58) Field of Classification Search ................... 180/167, 180/169, 170, 171, 268, 275, 281; 280/734, 280/735, 806; 340/425.5, 435, 436, 438; 701/45–47, 96, 300–302
See application file for complete search history.

(56) References Cited

U.S. PATENT DOCUMENTS

| | | | | |
|---|---|---|---|---|
| 3,892,483 A | * | 7/1975 | Saufferer | 356/3.12 |
| 5,278,764 A | * | 1/1994 | Iizuka et al. | 701/301 |
| 5,471,214 A | * | 11/1995 | Faibish et al. | 342/70 |
| 5,552,986 A | | 9/1996 | Omura et al. | |
| 5,627,510 A | * | 5/1997 | Yuan | 340/435 |

(Continued)

FOREIGN PATENT DOCUMENTS

DE    44 11 184 C2    10/1994

(Continued)

OTHER PUBLICATIONS

International Search Report dated Mar. 27, 2006 with English translation of relevant portion and PCT/ISA/237 with English translation of relevant portion (Fourteen (14) pages).

(Continued)

*Primary Examiner* — Paul N Dickson
*Assistant Examiner* — Laura Freedman
(74) *Attorney, Agent, or Firm* — Crowell & Moring LLP

(57) ABSTRACT

In a method and apparatus for collision avoidance or collision mitigation for a vehicle, an existing driving space between the vehicle and a potential collision object is detected. A first warning function and/or an information function is activated when a first threshold value is reached. A system intervention with autonomous partial braking combined with at least one further safety measure is activated when a second threshold value is reached.

14 Claims, 2 Drawing Sheets

U.S. PATENT DOCUMENTS

| | | | |
|---|---|---|---|
| 5,748,477 A * | 5/1998 | Katoh | 701/301 |
| 5,821,897 A | 10/1998 | Bradley | |
| 5,983,161 A * | 11/1999 | Lemelson et al. | 701/301 |
| 6,085,151 A * | 7/2000 | Farmer et al. | 701/301 |
| 6,420,996 B1 * | 7/2002 | Stopczynski et al. | 342/70 |
| 6,452,535 B1 | 9/2002 | Rao et al. | 342/72 |
| 6,498,972 B1 * | 12/2002 | Rao et al. | 701/45 |
| 6,519,519 B1 * | 2/2003 | Stopczynski | 701/45 |
| 6,553,130 B1 | 4/2003 | Lemelson et al. | 382/104 |
| 6,659,572 B2 * | 12/2003 | Bond et al. | 303/193 |
| 6,721,659 B2 * | 4/2004 | Stopczynski | 701/301 |
| 6,831,572 B2 * | 12/2004 | Strumolo et al. | 340/903 |
| 6,856,874 B2 * | 2/2005 | Weilkes et al. | 701/45 |
| 6,856,906 B2 * | 2/2005 | Winner et al. | 701/301 |
| 6,859,731 B2 * | 2/2005 | Takafuji et al. | 701/301 |
| 6,873,891 B2 * | 3/2005 | Moser et al. | 701/48 |
| 7,035,735 B2 * | 4/2006 | Knoop et al. | 701/301 |
| 7,124,027 B1 * | 10/2006 | Ernst et al. | 701/301 |
| 7,145,441 B2 * | 12/2006 | Knoop et al. | 340/435 |
| 7,194,347 B2 * | 3/2007 | Harumoto et al. | 701/45 |
| 7,425,043 B2 * | 9/2008 | Doerr et al. | 303/193 |
| 7,480,570 B2 * | 1/2009 | Yopp et al. | 701/301 |
| 7,617,048 B2 * | 11/2009 | Simon et al. | 701/301 |
| 7,668,633 B2 * | 2/2010 | Diebold et al. | 701/36 |
| 7,828,104 B2 * | 11/2010 | Akaba et al. | 180/268 |
| 2003/0149530 A1 | 8/2003 | Stopczynski | |
| 2004/0030499 A1 | 2/2004 | Knoop et al. | |
| 2004/0122578 A1 * | 6/2004 | Isaji et al. | 701/70 |
| 2005/0114000 A1 * | 5/2005 | Cashler | 701/45 |
| 2006/0097504 A1 | 5/2006 | Akaba et al. | |
| 2006/0220908 A1 * | 10/2006 | Petersen et al. | 340/903 |

FOREIGN PATENT DOCUMENTS

| | | |
|---|---|---|
| EP | 0 544 468 A2 | 6/1993 |
| JP | 3-224858 A | 10/1991 |
| JP | 4-372442 A | 12/1992 |
| JP | 2004-276896 A | 10/2004 |
| JP | 2004-338588 A | 12/2004 |
| WO | WO 2004/085220 A1 | 10/2004 |

OTHER PUBLICATIONS

Japanese Office Action dated Aug. 17, 2011 (four (4) pages).

* cited by examiner

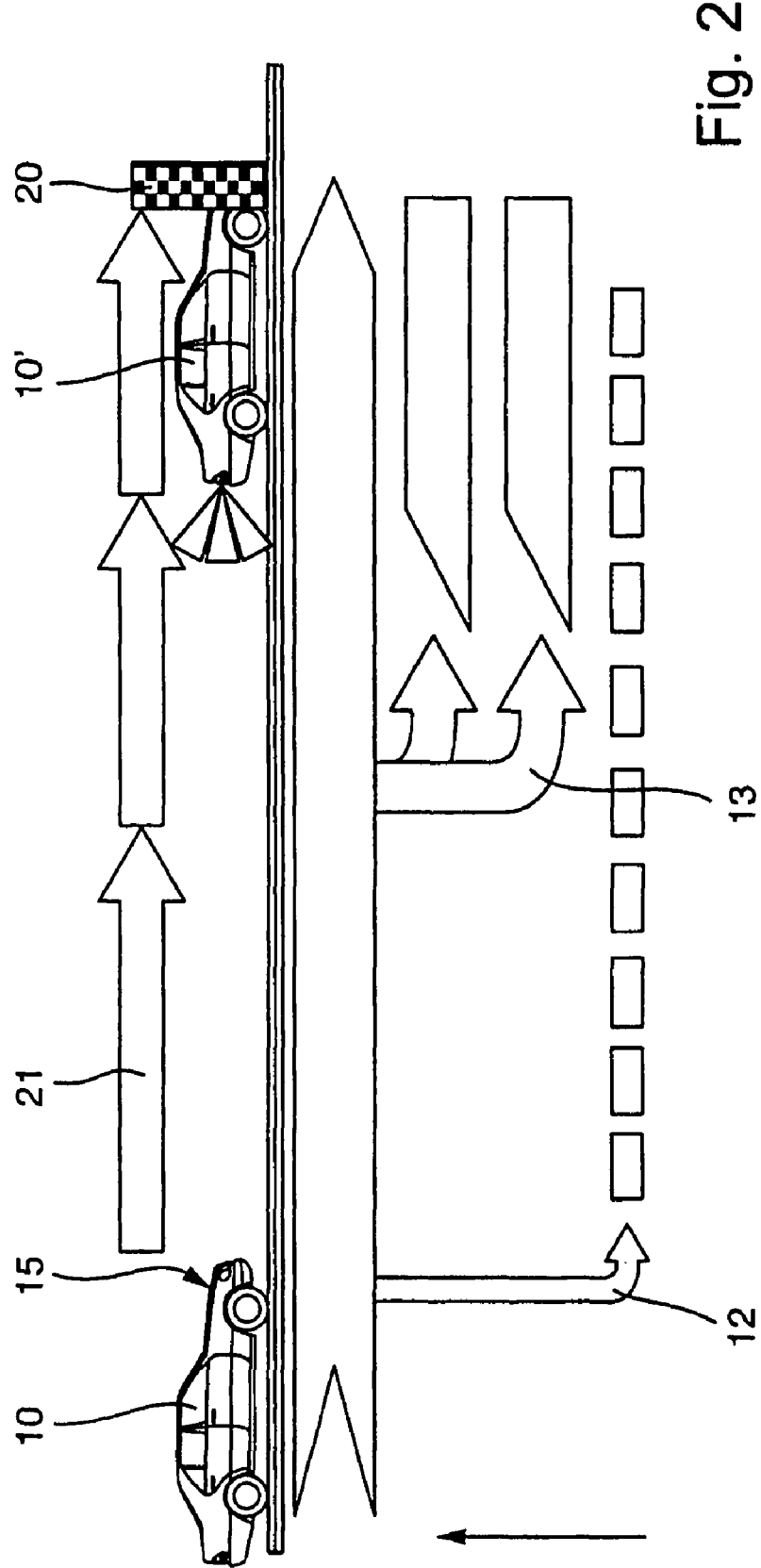

METHOD AND APPARATUS FOR AVOIDING OR MITIGATING VEHICLE COLLISIONS

This application is a national stage of PCT International Application No. PCT/EP2005/013207, filed Dec. 9, 2005, which claims priority under 35 U.S.C. §119 to German Patent Application No. 10 2004 062 496.8, filed Dec. 24, 2004, the disclosure of which is expressly incorporated by reference herein.

BACKGROUND AND SUMMARY OF THE INVENTION

The invention relates to a method for operating a collision avoidance or collision mitigation system of a vehicle and to a collision avoidance or collision mitigation system.

Systems for distance and speed control are widely known, which not only intervene in a braking maneuver in a case of doubt, but also can predict rear end collisions and, as a result, minimize the risk for the passengers. In such so-called "collision mitigation systems" (CMS), all necessary countermeasures are already initiated automatically before a possible collision with a potential collision object. Thus, the known CMS calculates the probability of a collision on the basis of driving conditions, distance from the preceding vehicle and relative speed. If necessary, the CMS then independently intervenes in order to prevent collisions. The timing for this system intervention is based on a necessary nominal delay and on a driver reaction time. Before the system intervention, a visual and/or audible warning function is activated in the known CMS. However, there is no additional safety function for the vehicle driver in this system.

German patent document DE 44 11 184 C2 discloses a controllable belt pretightener, which is effective only up to a certain pretensioning force before the collision, as safety function against a possible collision of a vehicle with a collision object. In the case of an actual collision, a second belt tightener with increased tensioning force is provided.

One object of the invention is to provide an improved collision avoidance or collision mitigation system for a vehicle, and a method of operating such a system.

This and other objects and advantages are achieved by the method according to the invention, in which an existing driving space between a vehicle and a potential collision object is detected and a first warning function and/or information function is activated when a first threshold value is reached. A system intervention with autonomous partial braking combined with at least one further safety measure is implemented when a second threshold value is reached. As a result, the collision avoidance system becomes much safer because, apart from the warning functions already known, partial braking is provided even before the actual system intervention, according to the invention. At the same time, the vehicle driver is additionally warned by the active safety function combined with the partial braking in a more time-critical situation.

As a first warning function and/or information function, for example, audible warning signals (e.g., conspicuous tones/sounds, voice outputs or also recommendations for actions) or visual warning signals (e.g., light signals) can be delivered. Furthermore, it is also possible to provide visual warning signals, such as visual instructions for actions on the display, or representations of the vehicle and of the obstacle on the display, or haptic warning signals (for example vibrations or rattling of the steering wheel). A haptic warning signal can also be belt pulling, which alerts the vehicle driver particularly urgently to an impending hazard situation.

As a further safety measure, fastening of passengers, designed as a safety function, for example in the form of belt tightening, can preferably take place. The partial braking and the belt tightening not only warn the vehicle driver, but also reduce the crash energy, even before a driver reaction.

In a preferred embodiment of the invention, the autonomous braking intervention can be reduced to a value which is below a deceleration required to collision avoidance. This has the advantage that the collision avoidance system cannot be misused as "distance assistant" but that the avoidance of a possible collision presupposes a degree of alertness of the vehicle driver. The partial braking can be carried out, for example, with a braking acceleration of about maximally 90% of the deceleration required for collision avoidance.

In addition, the braking acceleration of the partial braking is advantageously maintained below a maximum limit predetermined in dependence on speed. At low driving speeds, a higher limit can thus be set for the braking acceleration than with higher driving speeds. For example, a braking acceleration of $-4$ m/s$^2$ can be set as a limit at a driving speed of up to about 50 km/h, a braking acceleration of $-3$ m/s$^2$ at a driving speed of about up to 150 km/h and a braking acceleration of $-2$ m/s$^2$ at a driving speed of about up to 250 km/h.

According to the invention, the system intervention for collision avoidance or collision mitigation can be designed as autonomous braking intervention and/or as autonomous steering intervention which can be deactivated on demand by a vehicle driver. For example, the system intervention can be deactivated by an emergency braking triggered by the vehicle driver. It can also be provided that a threshold value calculated from brake pedal travel and brake pedal speed is determined for the deactivation of the system intervention, for example when at least 50% of the pedal travel is reached.

In an improved system, short or fast braking events can be intercepted such as, for example, those shortly before overtaking when the vehicle driver approaches a vehicle ahead and the passing lane is not free yet. An exit from system intervention can also be achieved by an acceleration triggered by the vehicle driver and/or by high steering dynamics (for example strong or fast steering wheel deflections). When system intervention is deactivated, only the audible and/or visual distance warning suitably occurs. The collision avoidance or collision mitigation system can thus be intuitively deactivated if the driver chooses alternative collision avoidance by giving gas, reducing the braking or by steering. The coordinated collision warning which is based on identical criteria in each case advantageously provides a continuous uniform system.

The invention also relates to a collision avoidance or collision mitigation system for a vehicle, which includes sensors for detecting the environment, for example in the form of a radar, a lidar (light detection and ranging), a video sensor and/or an ultrasonic sensor as means for detecting an existing driving space between the vehicle and the potential collision object. The environmental sensors are particularly preferably constructed as 77-GHz radar sensors which can advantageously have a range of between about 7 and 150 m with an aperture angle of approx. 9°.

In an alternative embodiment, two 24-GHz radar sensors which in each case can have a range of about 0.1 to 30 m at an aperture angle of approx. 45° can be constructed alternatively or additionally. The use of these sensors advantageously achieves a higher object quality than in the case of a known vehicle interval controller with the same sensor configuration. Although the same objects are advantageously detected in this manner standing objects can also be observed; such objects frequently are not detected by conventional sensors, or can be detected too often or wrongly. According to the invention, with the given objective of higher object quality, the risk of mistriggerings or wrong triggerings can be reduced in fact, for example, the reaction of the vehicle driver is also utilized for recognizing a situation.

Using the sensors provided, the objects can be seen for a long time and reliably even on curvy roads full with multiple lanes. Due to the narrower lane requirements achieved by using these sensors, for example, drivers cutting in can be admitted later and drivers moving out can be released earlier. Furthermore, standing objects can be advantageously taken into consideration if they have previously moved. For example, it is possible to take into consideration a vehicle which is stopped at a traffic light and which has been continuously detected before stopping, or an immobile object whose own speed is less than about 72 km/h can be taken into consideration if it has previously been detected particularly reliably by the sensor. Overall, the sensor system advantageously provides for a reliable interpretation and intelligent situation analysis even in the case of critical scenarios.

In the case of hazard of wrongly positioned objects or of soiling, the reliability of the sensors can reach its limits.

The environment-detecting sensors supply the necessary information for detecting the actual state of the situation around the vehicle. Using the environment-detecting sensors, distance values between the vehicle and obstacles in the environment of the vehicle are calculated. In this process, the relevant potential collision object is selected and evaluated for an instantaneous collision hazard by means of the "time-to-avoid" and "time-to-brake" criteria. "Time-to-avoid" comprises a period which remains for the vehicle driver to subsequently prevent a collision with the potential collision object by means of an evasion maneuver, and "time-to-brake" comprises a period which remains to the vehicle driver for subsequently preventing a collision with a potential collision object by means of a braking maneuver. By means of these factors, in conjunction with the data recorded by the environment-detecting sensors, a situation evaluation can be produced by means of which accident-critical situations can be accurately predicted.

The collision avoidance or collision mitigation system according to the invention is advantageously activated on the basis of the situation evaluation and a vehicle status interpretation. The vehicle status interpretation can be used for detecting an instantaneous vehicle status for which purpose a distance warning function of a known vehicle interval controller is used. The vehicle interval controller recognizes a preceding vehicle by radar and detects its distance and speed. As soon as the sensors signal clear track ahead, the vehicle automatically accelerates up to the traveling speed desired by the vehicle driver. The vehicle interval controller can thus predictively select the appropriate speed in the traffic flow and adapt it to the respective situation. In this arrangement, the vehicle interval controller can always maintain the appropriate distance from the preceding vehicle.

The method according to the invention advantageously activates a safety function in addition to the known vehicle interval controller function. In this arrangement, an analytical controller can output a value for a nominal delay required for collision avoidance, which is calculated by means of a distance between the vehicle and the potential collision object and a relative speed. The relative speed is the speed at which the vehicle is approaching the potential collision object.

Overall, the activated collision avoidance or collision mitigation system provides a particularly advantageous graded safety function which can be intuitively deactivated depending on the reaction of the vehicle driver. If the vehicle driver brakes independently, there is advantageously a transition to the autonomous braking assistance system, developed in accordance with the invention, which is carried out in conjunction with the further safety measure, for example belt tightening.

Other objects, advantages and novel features of the present invention will become apparent from the following detailed description of the invention when considered in conjunction with the accompanying drawings.

BRIEF DESCRIPTION OF THE DRAWINGS

FIG. 2 is a functional representation of the collision avoidance system.

DETAILED DESCRIPTION OF THE DRAWINGS

Figure 1:
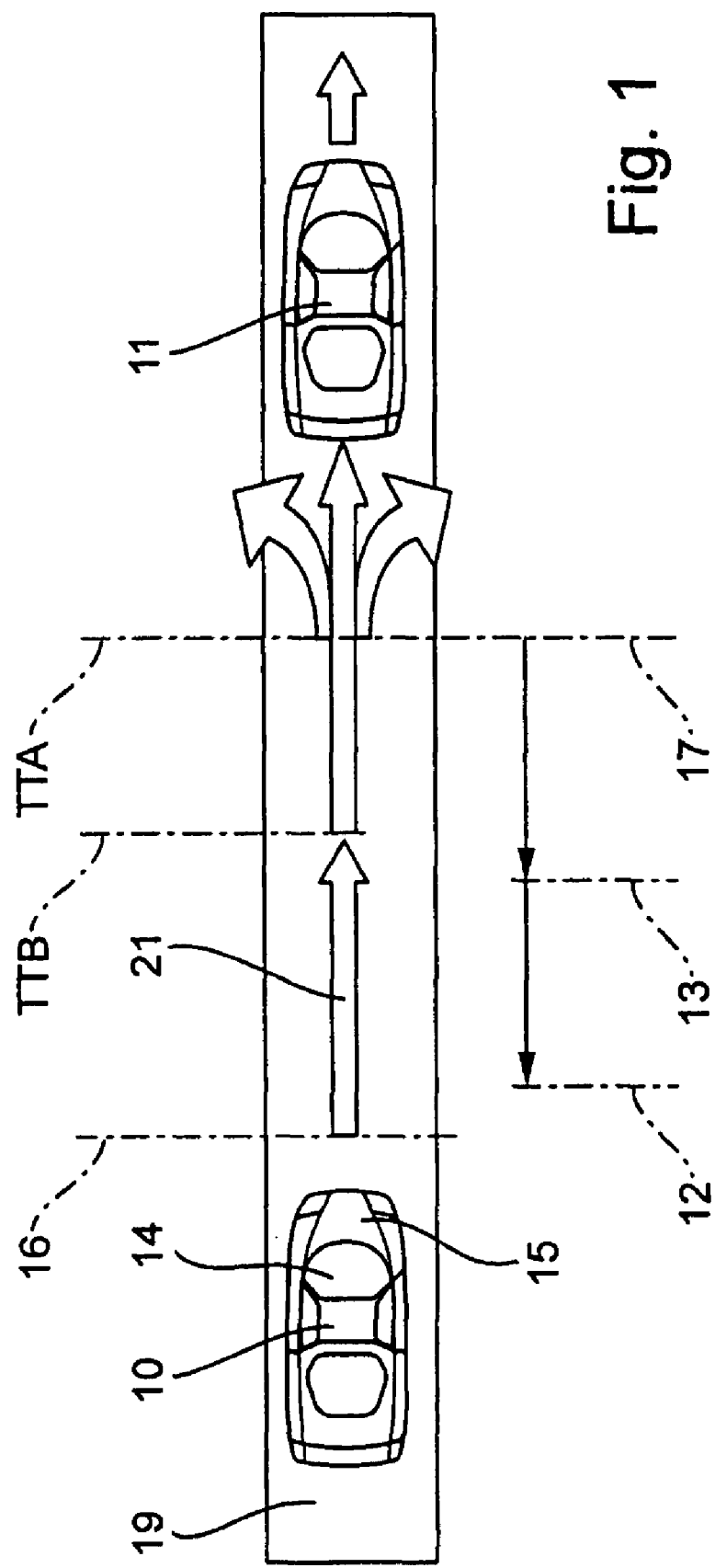
FIG. 1 illustrates a situation evaluation for activating the method according to the invention for operating a collision avoidance system.

Identical elements or elements essentially remaining identical are numbered with the same reference symbols in the figures.

FIG. 1 diagrammatically shows a situation evaluation of the method according to the invention. A vehicle 10 equipped with a collision avoidance system CMS according to the invention approaches the rear of a potential collision object, represented by a vehicle 11. Both vehicles 10 and 11 are located in the same lane 19. The vehicle 10 is moving in approximately the same direction 21 as the vehicle 11. At a time 16, the known distance warning system of vehicle 10 indicates the last possible time for collision avoidance by braking with a braking acceleration of about $-2$ m/s$^2$.

A line TTB indicates a last time for initiating collision-avoiding full braking. The time interval from the instantaneous time up to the time TTB thus represents a time-to-brake which remains for the driver of the vehicle 10 to avoid a collision with the vehicle 11 by means of emergency braking. A line TTA indicates a last time for initiating a collision-avoiding evasion maneuver. The time interval from the instantaneous time to the time TTA thus represents a time-to-avoid which remains for the driver of the vehicle 10 to prevent a collision with a potential collision object 11 by means of an evasive maneuver. The time TTB lies before the time TTA if the potential collision object drives at approximately the same speed (i.e., a collision can still be avoided by a later evasion maneuver). When the collision object is stopped, the constellation can be reversed. That is, the time TTA can be before the time TTB in this constellation (not shown).

Overall, the situation evaluation criterion for the collision avoidance or collision mitigation system according to the invention is the latest possible reaction time 17 of the vehicle driver for still being able to avoid a collision, which can be the time TTA or the time TTB depending on the situation described above.

The situation is evaluated on the basis of input data detected by the environment-detecting sensors 14. For this purpose, object information is determined, for example distance values from the potential collision object 11, relative speed and acceleration. Similarly, data with respect to the vehicle's own movement (for example, its own speed and acceleration) are detected. From these input data, the collision hazard is calculated by determining the time TTA and TTB. At the same time, a physically necessary uniform delay (a_phys) is calculated which is required for avoiding an impact.

According to the invention, partial braking is performed with a braking acceleration which is maximally 90% of the physically necessary uniform delay (a_phys), the maximum limit for braking acceleration being predetermined in dependence on speed. At low driving speeds, a higher limit is set for the braking acceleration than at higher driving speeds. For example, a braking acceleration of about $-4$ m/s$^2$ can be set as limit with a driving speed of up to about 50 km/h, a braking acceleration of about $-3$ m/s$^2$ can be set with a driving speed of about up to 150 km/h and a braking acceleration of about $-2$ m/s$^2$ can be set with a driving speed of about up to 250 km/h. The maximum braking acceleration which can be achieved by the partial braking thus depends on the vehicle's own speed and in any case remains below the uniform delay (a_phys) physically necessary for avoiding collisions.

Naturally, the braking acceleration is limited only to the extent that the driver does not require a higher delay; that is, the driver can overcome the limitation by active brake operation.

When a first threshold value 12 defined relative to the reaction time 17 is reached, a first warning function and/or information function is activated. The warning is preferably visual and/or audible. A haptic warning, for example in the form of belt pulling, is also possible.

When a second threshold value 13, which is defined relative to the reaction time 17 and which is closer to the reaction time 17 than the first threshold value 12, is reached, a situation with acute rear end collision hazard is assumed and a system intervention in the form of autonomous partial braking combined with a further safety measure, for example fastening of passengers in the form of belt tightening, is activated. The second threshold value 13 is, for example, about 1.4 seconds before the latest possible reaction time 17. The first threshold value 12 is at least approx. 1 second, preferably 0.8 seconds before the second threshold value 13.

According to the invention, the collision avoidance or collision mitigation system can be deactivated by the vehicle driver. There must then be data inputs in the form of an operation of vehicle operating elements, particularly via the brake and gas pedal and via the steering wheel, and information about the vehicle's own movement (speed and acceleration). The driver deactivation criteria are then determined, wherein the deactivation condition is determined with respect to a steering movement. It is also determined whether the vehicle driver brakes less than at the beginning of the warning or if the driver gives more gas than at the beginning of the warning or even a "kick-down" has been carried out which must be interpreted as an indication of an emergency situation. The criteria for deactivation are also met if the corresponding function is switched off in a combined menu. If one of the above criteria is met, a deactivation signal is output to the driver.

FIG. 2 diagrammatically shows a functional representation of the collision avoidance system, with a vehicle 10 being located on a collision course with a stationary potential collision object 20. FIG. 2 shows the spatial positions of the vehicle 10, equipped with a device according to the invention, in normal travel more than 3 seconds before a collision and the vehicle 10' is shown during a "pre-crash phase" (that is, less than about one second before the collision). It shows a sequence from normal travel via a warning phase (about 2 to 3 seconds before a possible collision if there is no system intervention), a support phase (about 1 to 2 seconds before the collision) and a pre-crash phase (less than 1 second before the collision) diagrammatically. The warning phase is used for accident avoidance whereas the measures initiated during the support and pre-crash phase are to mitigate the severity of an accident.

The vehicle 10 comprises environment-detecting sensors 14 for detecting an existing driving space between the vehicle 10 and the potential collision object 20. In particular, these are two 24-GHz radar sensors and/or one 77-GHz radar sensor.

When the first threshold value 12 is reached, means 15 for outputting a first warning function and/or information function are activated.

The environment-detecting sensors facilitate a situation evaluation, the individual criteria of which have been described with respect to FIG. 1 in order to identify situations with an acute rear end collision hazard.

In addition, a vehicle status interpretation is performed the determining factors of which are, in particular, a vehicle's own movement (its own speed and acceleration), activation of information and/or warning signals, deactivation signals, object information and the physically necessary uniform delay (a_phys). The vehicle status interpretation is carried out by a calculation whether the vehicle 10 is approaching the collision object 20. In addition, it is determined whether the physically necessary uniform delay exceeds a predetermined threshold of, for example 2.5 m/s$^2$ (that is, whether it is high enough to justify an autonomous braking intervention). In contrast, at lower values of the necessary delay, it is assumed that the driver can produce the delay himself by comfortable braking and autonomous braking intervention is not required. In addition, it is ensured that the information and warning signals are activated during a minimum period, for example 0.8 seconds. Furthermore, it is checked whether none of the deactivation conditions are met. If all criteria are met, a signal with respect to the vehicle status interpretation is output which specifies whether there is a vehicle status for which autonomous braking intervention should be allowed.

These data are acquired by an evaluating unit which uses input data relating to object information and vehicle's own movement by means of an analytical controller, to calculate what nominal delay is necessary for correcting a distance from the object which depends on its own instantaneous speed. As an output signal, the controller outputs the calculated nominal delay which, as described above, is then limited in order to eliminate a misuse of the collision avoidance system as distance assistant.

In conjunction with the situation evaluation, the collision avoidance or collision mitigation system is then activated. For this purpose, an activation unit is provided with inputs for the result of the situation evaluation (acute rear end collision hazard), for the limited nominal delay and for the result of the vehicle status interpretation. The actual system intervention is activated by the activation unit when the criteria "situation with acute rear end collision" and "driving state allows autonomous braking intervention" are met and if additionally the object detected by sensors is still valid and a valid value is available for the limited nominal delay, namely a negative acceleration. An output signal "CMS active" is then output to the collision avoidance or collision mitigation system according to the invention, as a result of which the latter is activated.

When the second threshold value 13 is reached, a system intervention with at least autonomous partial braking can be activated. The autonomous partial braking is advantageously effected in combination with a further safety measure, preferably in the form of passenger fastening such as, for example, belt tightening.

If the vehicle driver is already braking, the autonomous partial braking has a supporting effect. In the case of loss of object or uncertainty, the warning phase and/or the support phase can be bypassed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a collision avoidance or mitigation system of a vehicle, said method comprising:
    detecting an existing driving space between the vehicle and a potential collision object;
    activating at least one of a first warning function and an information function when a first threshold value is reached; and
    activating a system intervention with autonomous partial braking combined with at least one further safety measure when a second threshold value is reached;
    wherein, said partial braking is a braking that is limited such that a resulting deceleration does not exceed a predetermined maximum value,
    wherein said partial braking is limited to a deceleration value that is less than a deceleration that is necessary to avoid a collision.

2. The method as claimed in claim 1, wherein said further safety measure comprises carrying out a passenger fastening.

3. The method as claimed in claim 1, wherein the partial braking is carried out with a braking acceleration which is limited to a maximum of 90% of a deceleration required for collision avoidance.

4. The method as claimed in claim 3, wherein the braking acceleration of the partial braking is limited to a maximum limit, which is predetermined dependent upon speed.

5. The method as claimed in claim 1, wherein:
    the system intervention comprises at least one of braking intervention and autonomous steering intervention; and
    said at least one of autonomous braking intervention and autonomous steering intervention is deactivated on demand by a vehicle driver.

6. The method as claimed in claim 5, wherein the system intervention is deactivated by an emergency braking triggered by the vehicle driver.

7. The method as claimed in claim 6, wherein a threshold value calculated from brake pedal travel and brake pedal speed is determined for the deactivation of the system intervention.

8. The method as claimed in claim 5, wherein the system intervention is deactivated by an acceleration triggered by the vehicle driver.

9. The method as claimed in claim 5, wherein the system intervention is deactivated by high steering dynamics of the vehicle driver.

10. A method for operating a collision avoidance or mitigation system of a vehicle, said method comprising:
    detecting an existing driving space between the vehicle and a potential collision object;
    activating at least one of a first warning function and an information function when a first threshold value is reached; and
    activating a system intervention with autonomous partial braking combined with at least one further safety measure when a second threshold value is reached;
    wherein, said partial braking is a braking that is limited such that a resulting deceleration does not exceed a predetermined maximum value,
    wherein the partial braking is carried out with a braking acceleration which is limited to a maximum of 90% of a deceleration required for collision avoidance,
    wherein the braking acceleration of the partial braking is limited to a maximum limit, which is predetermined dependent upon speed, and
    wherein at low driving speeds, a higher limit is set for the braking acceleration of the partial braking than at higher driving speeds.

11. A collision avoidance or collision mitigation system for a vehicle comprising:
    means for detecting an existing driving space between the vehicle and a potential collision object;
    means for activating at least one of a first warning function and an information function when a first threshold value is reached; and
    means for activating a system intervention with autonomous partial braking combined with at least one further safety measure when a second threshold value that is less than said first threshold value is reached;
    wherein, said partial braking is a braking that is limited such that a resulting deceleration does not exceed a predetermined maximum value,
    wherein said partial braking is limited to a deceleration value that is less than a deceleration that is necessary to avoid a collision.

12. The system as claimed in claim 11, wherein the means for detecting an existing driving space between the vehicle and the potential collision object comprises environment-detecting sensors.

13. The system as claimed in claim 12, wherein the environment-detecting sensors comprise at least one 77-GHz radar sensor.

14. The system as claimed in claim 12, wherein the environment-detecting sensors comprise at least one 24-GHz radar sensor.

* * * * *